United States Patent
Andersson et al.

(10) Patent No.: US 11,904,783 B2
(45) Date of Patent: Feb. 20, 2024

(54) VEHICLE MICROPHONE ACTIVATION AND/OR CONTROL SYSTEMS

(71) Applicant: ARRIVER SOFTWARE LLC, Novi, MI (US)

(72) Inventors: Stefan Andersson, Vargarda (SE); Olof Hugo Eriksson, Vargarda (SE); Philippe Vincent, Vargarda (SE)

(73) Assignee: Arriver Software LLC, Novi, MI (US)

( * ) Notice: Subject to any disclaimer, the term of this patent is extended or adjusted under 35 U.S.C. 154(b) by 877 days.

(21) Appl. No.: 16/960,061

(22) PCT Filed: Jan. 7, 2019

(86) PCT No.: PCT/US2019/012552
§ 371 (c)(1),
(2) Date: Jul. 3, 2020

(87) PCT Pub. No.: WO2019/136383
PCT Pub. Date: Jul. 11, 2019

(65) Prior Publication Data
US 2021/0053516 A1    Feb. 25, 2021

Related U.S. Application Data

(60) Provisional application No. 62/614,276, filed on Jan. 5, 2018.

(51) Int. Cl.
*B60R 11/02*       (2006.01)
*B60R 16/037*     (2006.01)
(Continued)

(52) U.S. Cl.
CPC .......... *B60R 16/0373* (2013.01); *G10L 15/26* (2013.01)

(58) Field of Classification Search
CPC ......... B60R 11/02; G10L 15/00; G10L 15/20; G10L 11/00
See application file for complete search history.

(56) References Cited

U.S. PATENT DOCUMENTS 9,598,048 B2    3/2017   Umakoshi et al.
2006/0250275 A1  11/2006  Rodemer
(Continued)

FOREIGN PATENT DOCUMENTS

DE       10033985        5/2001
DE     102013007141     12/2013
(Continued)

OTHER PUBLICATIONS

Apr. 9, 2019 PCT/US19/12552 Written Opinion (7 pgs).
(Continued)

*Primary Examiner* — Tan Q Nguyen
(74) *Attorney, Agent, or Firm* — Arriver Software LLC

(57) ABSTRACT

Systems and methods for vehicle microphone activation and/or identification of incoming speech-to-text data by the location of the speaking occupant. In some embodiments, the system may comprise a plurality of microphones, each of which may be linked with a particular occupant/seat in the vehicle. The system may be configured to link incoming STT data with a particular microphone/occupant. This may be done by an explicit trigger from an occupant or by actuation of a button or other actuation means by a vehicle occupant. The STT data may then be processed using the location data.

29 Claims, 2 Drawing Sheets

(51) Int. Cl.
*G10L 15/26* (2006.01)
*G10L 15/20* (2006.01)

(56) References Cited

U.S. PATENT DOCUMENTS

| | | | |
|---|---|---|---|
| 2010/0088093 A1* | 4/2010 | Lee | G10L 15/20 |
| | | | 704/E15.045 |
| 2014/0163774 A1 | 6/2014 | Demeniuk | |
| 2016/0039356 A1* | 2/2016 | Talwar | H04R 3/00 |
| | | | 381/86 |
| 2016/0288766 A1 | 10/2016 | Jayasuriya et al. | |
| 2017/0206059 A1* | 7/2017 | Yang | G10L 15/32 |
| 2017/0240066 A1* | 8/2017 | Wang | B60N 2/002 |
| 2018/0182382 A1* | 6/2018 | Lee | G10L 25/78 |
| 2019/0045319 A1* | 2/2019 | Hotary | H04S 7/303 |
| 2021/0081650 A1* | 3/2021 | Kienzle | G06F 3/017 |

FOREIGN PATENT DOCUMENTS

| | | |
|---|---|---|
| EP | 1180454 | 2/2002 |
| EP | 3085583 | 10/2016 |
| WO | 1999049698 | 9/1999 |

OTHER PUBLICATIONS

Apr. 9, 2019 PCT/US19/12552 International Search Report (2 pgs).
DE 102013007141 Speech Input System for Motor Car, Daimler, Machine Translation, (13 pgs).
DE 10033985 Free Microphone Holder, Paragon, Machine Translation (11 pgs).
WO 1999/049698 Method and Device for Operating a Microphone System, especially in a Motor Vehicle, Volkovagen Activa Gesellschaft Germany, Machine Translation (12 pgs).

* cited by examiner

VEHICLE MICROPHONE ACTIVATION AND/OR CONTROL SYSTEMS

CROSS-REFERENCE TO RELATED APPLICATIONS

This application claims the benefit of U.S. Provisional Patent Application No. 62/614,276, filed Jan. 5, 2018 and titled "VEHICLE MICROPHONE ACTIVATION AND/OR CONTROL SYSTEMS," which is hereby incorporated herein by reference in its entirety.

SUMMARY

Many current vehicles utilize speech to text (STT) and/or text to speech (TTS) technologies to allow the driver to deliver commands and/or receive information audibly from the vehicle during vehicle operation. However, current microphone activation and/or control systems suffer from many drawbacks, such as accurately determining when the driver is delivering speech that is intended to be used in an STT context. If, for example, the system is constant listening to a microphone in a vehicle, it may be difficult for the system to know when to start processing incoming speech and/or converting such speech into text. Many consumer electronic devices have a button to push when you want to activate STT or may listen for a trigger word or phrase to begin STT processing. However, such solutions have many drawbacks that may render them less than ideal for use in vehicles. Moreover, it may be useful to provide the ability for other vehicle occupants to deliver STT commands and/or receive TTS information from a vehicle, and, in some cases it may be useful for a vehicle to be able to distinguish between incoming commands between various vehicle occupants.

The present inventors have therefore determined that it would be desirable to provide systems and methods that overcome one or more of the foregoing limitations and/or other limitations of the prior art. In some embodiments, the inventive concepts disclosed herein may be used to determine which of the vehicle occupants is speaking. In this manner, input from the various occupants may be delivered into the STT system from a preferred microphone (in embodiments having a plurality of microphones). This may also allow the system to treat the incoming STT data differently based upon the delivering occupant and/or provide TTS or other communication, such as displays, sounds, lights, haptic feedback, etc., individually to a particular occupant or subset of the vehicle occupants.

Some embodiments may also, or alternatively, provide for microphone triggers or actuations using features incorporated into vehicle seatbelts. In some such embodiments, the microphone actuation may be provided by using existing seatbelt technology, which may include sensors for detecting forces or other parameters, such as the length of seatbelt extraction from a seatbelt retractor. Some embodiments may also be configured to operate in conjunction with vehicles having microphones incorporated into the seatbelts.

By utilizing such existing technology, some embodiments may allow for triggering of STT "listening" from a user manipulating the seatbelt in a predetermined pattern, sequence, or fashion. For example, some embodiments may be configured to trigger such listening by a user pulling on the seatbelt within a predetermined number, threshold, or range of numbers, within a predetermined length or threshold/range of lengths of the seatbelt that has been pulled through/by a sensor, and/or within a predetermined or threshold/range of speeds.

When used in conjunction with a plurality of microphones, each of which may also be incorporated into a seatbelt or otherwise placed in proximity to a particular occupant among a plurality of vehicle occupants, this technology may allow for specialization of STT and/or TTS communication based upon the location of the speaker/occupant or otherwise altering the functionality of one or more vehicle systems differently based upon the location of the speaker/occupant. For example, when the system detects or predicts that a voice has come from a particular occupant/location, the system may mute or other vise modify one or more speakers in the vehicle (in some embodiments, the entire sound system in the vehicle). In some embodiments, such muting or other modification may take play only at one or more speakers in proximity to the activated microphone.

When combined with other microphones that may also be installed in the vehicle, the inventive concepts described herein may further improve the probability of recognizing who is speaking and/or improve the quality for the speech (STT input) with filtering algorithms using a variety of available inputs, such as belt microphones, roof microphones, radio/infotainment information, etc.

In a more particular example of a system for receipt of STT data, identification of the location/source of such data, and/or for adjustment of various operational parameters using such data according to some embodiments, the system may comprise a plurality of microphones, each microphone of which may be located most closely to or otherwise linked with a particular occupant/seat in the vehicle. The system may be configured to link incoming STT data with a particular microphone/occupant. This may be done, for example, by an explicit trigger from an occupant, such as activation of a predetermined pull sequence on a seatbelt for a particular occupant or by actuation of a button or other actuation means by a vehicle occupant. Alternatively, this may be accomplished by other means not requiring an action by an occupant, such as by comparing signals from a plurality of microphones or otherwise automatically assessing the probability of a signal having come from a particular microphone. The system may also, or alternatively, be configured to process incoming STT data, provide responses to incoming STT data, and/or take actions based upon such data, in a manner that factors in the location, either confirmed or assessed based upon a probabilistic algorithm, of the location of the speaker of the STT data.

In another example of a method for improving speech recognition within a vehicle according to some implementations, the method may comprise receiving audio from a plurality of microphones located within a vehicle. Some of this audio may be used to generate speech-to-text data. The audio may be processed to estimate or determine a location of a vehicle occupant from which occupant speech, which may be part of the audio received, originated. One or more operational parameters of a system of the vehicle may then be adjusted based upon the estimated or determined location of the vehicle occupant.

In some implementations, each of the plurality of microphones may be physically coupled to a seatbelt of the vehicle, such as positioned on or within a seatbelt.

In some implementations, the step of adjusting an operational parameter of a system of the vehicle based upon the estimated or determined location of the vehicle occupant may comprise muting or ignoring sound from each of the plurality of microphones other than a microphone of the vehicle occupant.

In some implementations, the step of adjusting an operational parameter of a system of the vehicle based upon the estimated or determined location of the vehicle occupant may comprise prioritizing one or more actions based upon the estimated or determined location of the vehicle occupant. For example, the step of adjusting an operational parameter of a system of the vehicle based upon the estimated or determined location of the vehicle occupant may comprise comparing the estimated or determined location of the vehicle occupant with a prioritization scheme and adjusting an operational parameter of a system of the vehicle in accordance with a position of the vehicle occupant within the prioritization scheme. For example, the driver may be given priority, or may be given exclusive access to, a certain number of commands, such as those that may impact movement of the vehicle.

In an example of a method for estimating or determining a location of a speaker within a vehicle for purposes of speech recognition processing, the method may comprise receiving a signal from a sensor coupled with a seatbelt assembly located within a vehicle and using the signal to identify a location of a vehicle occupant for speech recognition. Speech may be received from the vehicle occupant using one or more microphones located within a vehicle and location data from the identified location of the vehicle occupant may be used to adjust an operational parameter of a system of the vehicle based upon the identified location of the vehicle occupant.

In some implementations, the sensor may comprise a microphone physically coupled to a seatbelt of the seatbelt assembly.

In some implementations, the step of receiving a signal from a sensor coupled with a seatbelt assembly located within a vehicle may comprise receiving signals from a plurality of microphones located within the vehicle including the microphone physically coupled to the seatbelt of the seatbelt assembly. Each of the plurality of microphones may be linked with a particular seat within the vehicle, and the step of using the signal to identify a location of a vehicle occupant for speech recognition may comprise processing the signals, including the signal from the microphone physically coupled to the seatbelt of the seatbelt assembly, to estimate a location of a vehicle occupant from which occupant speech originated.

In some implementations, the sensor may be positioned within a seatbelt retractor of the seatbelt assembly and may comprise, for example, a payout sensor configured to sense a length with which the seatbelt has been extended through the retractor and/or a timer to allow for detecting a seatbelt pull sequence. Thus, the step of receiving a signal from a sensor coupled with a seatbelt assembly located within a vehicle may comprise translating a pull sequence of a seatbelt of the seatbelt assembly into the signal.

Some implementations may further comprise receiving image data from one or more cameras located within the vehicle and using the image data, in some cases in combination with the signal and/or audio data, to identify a location of a vehicle occupant for speech recognition.

In an example of a vehicle speech recognition system according to some embodiments, the system may comprise a plurality of microphones, each of which is preferably linked with a particular seat in a vehicle. The system may further comprise a vehicle speech system module configured to generate occupant location data indicative of a location of a vehicle occupant for speech recognition and a vehicle control system configured to receive occupant location data and adjust an operational parameter of a system of the vehicle based upon the location of the vehicle occupant. The vehicle control system may be configured to control physical operation/movement of the vehicle, may be configured to control operation of other features of the vehicle, such as the radio, responding to informational requests, and the like, or both.

In some embodiments, each of the plurality of microphones may be physically coupled to a seatbelt of the vehicle. In some embodiments, one or more seats of the vehicle may comprise a seatbelt assembly comprising a seatbelt and a sensor configured to detect a pull sequence of the seatbelt. In some such embodiments, upon detecting the pull sequence, the vehicle speech system module may be configured to assign the seat associated with the pull sequence to the incoming speech or otherwise generate occupant location data indicative of a location of a vehicle occupant associated with the at least one seat of the vehicle. In some embodiments, each seat of the vehicle may comprise a seatbelt assembly comprising a seatbelt and a sensor configured to detect a pull sequence of the seatbelt to allow the vehicle to assign seat locations to each of the seats upon detecting the requisite pull sequence.

Some embodiments may further comprise one or more cameras configured to send occupant image data to the vehicle speech system module. The vehicle speech system module may be configured to generate occupant location data indicative of a location of a vehicle occupant for speech recognition using occupant image data from the at least one camera and audio data from at least one of the plurality of microphones. In some such embodiments, the one or more cameras may be configured to generate occupant image data for each seat in the vehicle, which occupant image data may be used to improve the accuracy of the occupant location data indicative of a location of a vehicle occupant for speech recognition.

Some embodiments may further comprise a text-to-speech module, which may be configured to generate targeted speech to vehicle occupants using the occupant location data.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
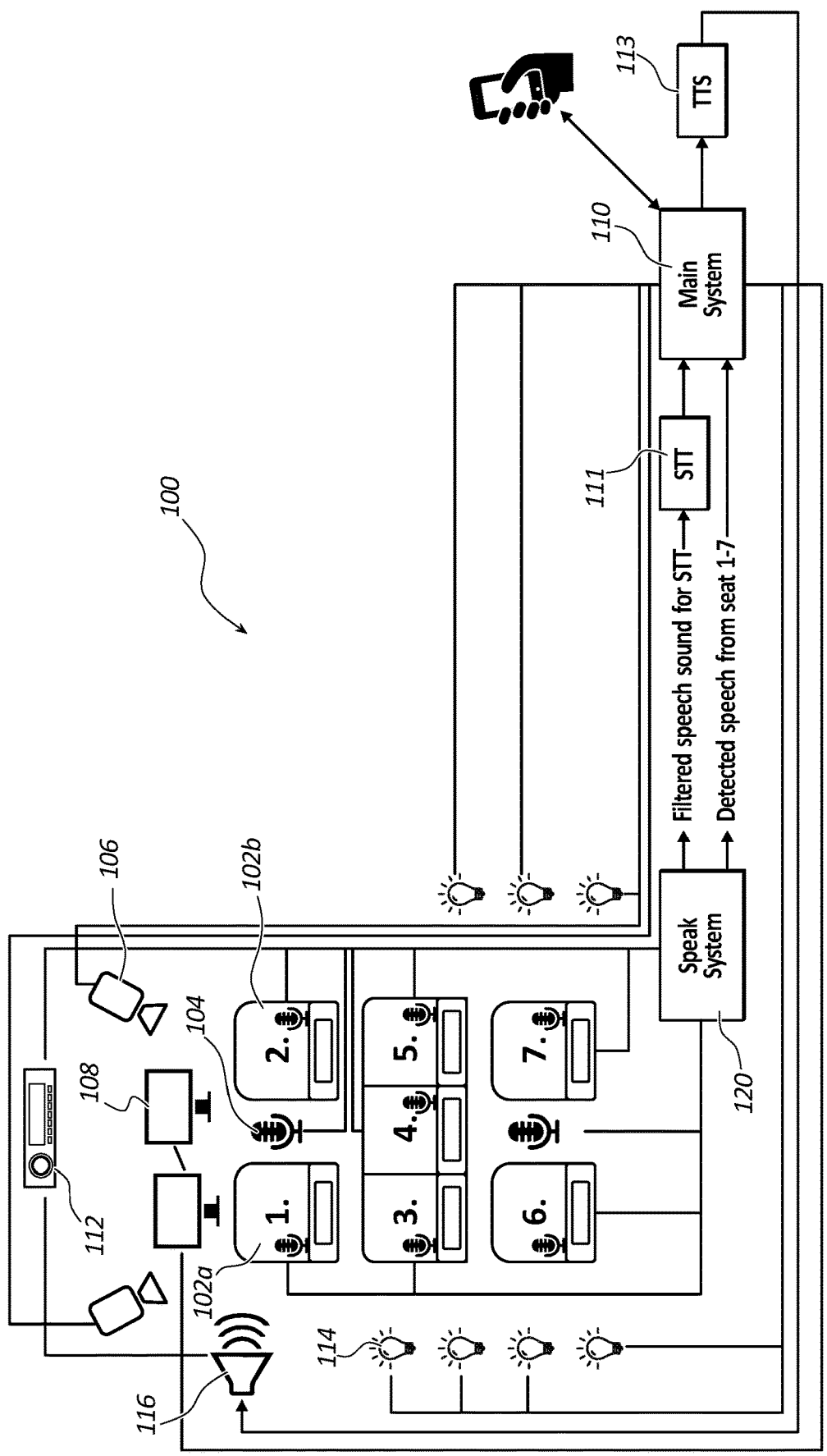
FIG. 1 is a schematic diagram of a vehicle comprising a system for receipt of STT data, identification of the location/source of such data, and/or for adjustment of various operational parameter using such data according to some embodiments.

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to systems and methods for activation of vehicle microphones, control of one or more vehicle systems using STT data, and/or for delivery of TTS data. In some embodiments, activation of one or more vehicle microphones may take place by manipulation of a seatbelt in a preconfigured manner, such as by pulling or otherwise manipulating the seatbelt in a particular pattern or sequence. Thus, in embodiments in which microphones are incorporated into each seatbelt, one or more vehicle control systems can be used to distinguish between incoming speech based upon the location of the speaker and adjust operational parameters accordingly. For example, some embodiments may be configured to shut off all other microphones, or at least a subset of all other microphones (such as all other seatbelt microphones or other microphones specifically linked to a particular vehicle occupant) after receipt of a signal indicative of an activation of a particular seatbelt microphone or other microphone associated with a particular vehicle occupant.

In some embodiments, the technology for activation of one or more microphones may be part of existing/known seatbelt technology. For example, some embodiments may utilize sensors incorporated into existing/known seatbelt retractors and may be configured to use data obtained from such sensors in order to determine whether to activate a particular microphone. Examples of such technology can be found in U.S. Patent Application Publication No. 2016/0288766 titled "Seatbelt Payout Measuring Device and System," which was filed on Mar. 31, 2015 and is hereby incorporated by reference in its entirety. As previously mentioned, some embodiments may also be configured to operate in conjunction with vehicles having microphones incorporated into the seatbelts. Examples of pre-existing technology for incorporation of microphones into seatbelts can be found in European Patent Publication No. EP 1180454 A2, which is also hereby incorporated by reference in its entirety. By using existing technology, certain embodiments and implementations of the inventions disclosed herein may provide for improved functionality without requiring expensive hardware upgrades.

In some embodiments, data indicative of the location of a speaker may be used, either alone or in combination with the seatbelt or other microphone activation technology described herein, by one or more vehicle systems in order to adjust operational parameters based upon the speaker's/occupant's location in the vehicle. For example, some embodiments may be configured to determine or at least estimate the location of the speaker. This may be done, for example, by comparing the volume of incoming speech using a plurality of microphones and identifying the microphone recording the highest volume intensity as the speaking microphone. In some such embodiments, the content of the audio received from each of the plurality of microphones may be compared to ensure that extraneous noise or other non-verbal sounds are not used in this comparison.

In more preferred embodiments, this determination may be made by receipt of a signal associated with a specific microphone and/or a specific vehicle occupant that triggers operation or "listening" of the microphone. For example, as previously discussed, some embodiments may rely upon a signal generated from a predetermined pull sequence or other manipulation of a seatbelt. For example, a sequence of two relatively short and quick pulls on the seatbelt may be used as the trigger. The parameters of the length, timing, speed, etc., of such pulls may be adjusted as desired, preferably to avoid false triggers. In order to utilize existing technology, as previously mentioned, some embodiments may rely on a pull sequence from the seatbelt retractor. However, it is contemplated that, in alternative embodiments, the pull sequence may comprise pulls on the seatbelt buckle, or elsewhere on the seatbelt (such as on a tether extending from the seatbelt). As another example, in some embodiments, the trigger may be activated by loosening the seatbelt (a range or threshold of the slack distance may be used) for a predetermined, threshold of time and/or then releasing the seatbelt. As another example, the trigger may be activated by engaging the automatic locking mechanism on a seatbelt retractor a predetermined number of times, which may happen by a series of quick pulls on the seatbelt. Thus, in some embodiments and implementations, a timer may be used, potentially along with or as part of the seatbelt sensor, to allow for the trigger to take into account the time during which the seatbelt has been extended, perhaps beyond a threshold payout distance.

The signal from such triggers may be used to determine the location of the speaker and/or to activate a microphone associated with the vehicle occupant, such as a microphone incorporated into the same seatbelt, for example. Some embodiments other embodiments may identify the location of the speaker using other means, such as buttons, switches, or other actuation means.

Following determination of the speaker/occupant position in the vehicle, some embodiments may be configured to adjust one or more operational parameters based upon the location of the speaker/occupant and/or the incoming STT data. For example, some embodiments may be configured to compare various sets of incoming STT data and prioritize actions based in incoming STT data from a particular speaker/occupant or subset of the possible speakers/occupants. For example, STT data from a driver may be prioritized over all other STT data in some embodiments.

Some embodiments may also, or alternatively, allow users to adjust certain settings associated with the STT/TTS system. For example, the system may allow a user to temporarily (or permanently) disable microphones associated with certain seat positions/occupants. Some embodiments may also allow a user to temporarily (or permanently) adjust a prioritization scheme associated with a plurality of vehicle microphones. For example, the driver may temporarily wish to allow the passenger to control the system and may therefore transfer the first priority to the passenger seat for a period of time.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

FIG. 1 depicts an example of a vehicle system 100 for receipt of STT data and for adjustment of various operational parameter using such data. System 100 comprises a main system 110 and a speech sub-system 120. One or more modules may also be provided, such as STT module 111 and/or TTS module 113, for converting speech to text and vice-versa.

As used herein, a software module or component may include any type of computer instruction or computer executable code located within a memory device and/or m-readable storage medium. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Furthermore, embodiments and implementations of the inventions disclosed herein may include various steps, which may be embodied in machine-executable instructions to be executed by a general-purpose or special-purpose computer (or another electronic device). Alternatively, the steps may be performed by hardware components that include specific logic for performing the steps, or by a combination of hardware, software, and/or firmware.

Embodiments and/or implementations may also be provided as a computer program product including a machine-readable storage medium having stored instructions thereon that may be used to program a computer (or other electronic device) to perform processes described herein. The machine-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions. Memory and/or datastores may also be provided, which may comprise, in some cases, non-transitory machine-readable storage media containing executable program instructions configured for execution by a processor, controller/control unit, or the like.

System 100 may further comprise a controller, which may be used to process data as those of ordinary skill in the art will appreciate. As used herein, the term controller refers to a hardware device that includes a processor and preferably also includes a memory element. The memory may be configured to store one or more of the modules referred to herein and the controller and/or processor may be configured to execute the modules to perform one or more processes described herein.

System 100 further comprises a plurality of microphones. More particularly, system 100 comprises a plurality of occupant/seat identified microphones, such as microphone 102a, which corresponds to the vehicle driver, and microphone 102b, which corresponds to the vehicle passenger. Various other microphones may be positioned in the rear of the vehicle, as shown in the figure. As previously mentioned, in some embodiments, these microphones may be incorporated into the seatbelts of each of the individual seats. However, in alternative embodiments, the microphones may be located elsewhere, such as located in the seats themselves, or in regions of the vehicle adjacent to the seats, such as in a portion of the vehicle ceiling, floor, and/or door in proximity to each seat.

System 100 may further comprise one or more non-seat/occupant-specific microphones, such as microphone 104. Various other elements, such as cameras 106, display screens 108, lights 114, and/or speakers 116 may be provided as desired in order to receive input from vehicle occupants and/or deliver information to vehicle occupants. In some embodiments, the audio system 112 may also be used as part of system 100. As also depicted in FIG. 1, some embodiments may be configured to operate in conjunction with mobile electronic devices, such as smart phones, tablets, and the like. These devices may be used, for example, to allow for adjustment of operational parameters of system 100.

In some embodiments and implementations, upon detecting a trigger, as previously mentioned, or otherwise activating one or more microphones, STT data, such as filtered speech sound, may be transmitted from speech system 120 to main system 110. In some embodiments, data associated with the specific location of the incoming STT data (e.g., which of seats 1-7) may also be sent to main system 110, either from speech system 120 or from another device or system. In some embodiments, speech system 110 may also use STT data from other microphones in the vehicle, such as microphones 104, in order to filter the sound so a high-quality signal can be delivered to the main system, in some embodiments using STT module 111. The STT signal may then be used by main system 110 for delivering intelligent support and/or TTS data from TTS module 113 so that, again, in some embodiments, a speech response can be delivered to one or more of the occupants in the vehicle.

In some embodiments, the position data previously mentioned (i.e., the location of the incoming data and therefore at least an estimate of the location of the speaker within the vehicle) and the STT data may be used to alternatively, or additionally, communicate with vehicle occupants either without speech (TTS) or in conjunction with such speech, using, for example, light from light(s) 114, haptic feedback (such as an active seatbelt), display information from display(s) 108, connected phones or other mobile devices, etc.

As another example, the STT data from STT module 111 may be used, either alone or in conjunction with the position/location data, to provide commands and/or directions to the vehicle to effect vehicle movement, such as navigation, braking, steering, or other vehicle functions. In some such embodiments, the TTS module 113 may be used to deliver confirmation to one or more occupants (in some cases, selectively to one or more targeted occupants using individual speakers or other communication means provided with each, or a subset of each, of the individual seats of the vehicle), such as confirmation of instructions, location information, vehicle navigation information, etc.

In some embodiments, the TTS or other communication to vehicle occupants may only be made to one or more specific occupants. For example, in embodiments in which location data is provided, the TTS or other communication may only be made to the vehicle occupant associated with the location data (e.g., the vehicle occupant from which the STT speech was identified). In some embodiments, the TTS or other communication to vehicle occupants may vary depending upon the type of information. For example, system 100 may be configured to respond to a general inquiry from a particular occupant with a response only to that occupant. However, a command that impacts vehicle operation, such as a command to signal a turn or set cruise control, may elicit a confirmation or other response that is delivered to both the driver and the speaker of the command, or to all occupants in the vehicle. Such parameters may be adjusted using mobile devices, a display screen in the vehicle, or by other suitable means.

In an example of a method for use of system 100, assume that the driver (occupant 1) speaks a command or other speech intended to elicit a response from system 100. System 100 may attempt to locate the occupant associated with the incoming sound. As previously mentioned, this may be done explicitly by the driver activating a seatbelt pull sequence, pressing a button linked to the driver's location, etc. Alternatively, system 100 may simply use multiple microphones, such as microphone 102*b* and/or other, non-seat specific microphones 104, to estimate the probability of the sound being linked with one or more of the vehicle occupants/microphones 102 and assign the incoming STT data to the seat/occupant with the highest probability. In some embodiments, this may be accomplished using other elements of system 102, such as camera(s) 106. For example, camera(s) 106 may use lip movement from one or more vehicle occupants in assigning the probability and/or seat/occupant speech location. In some embodiments, other sounds, such as sounds received from non-probabilistic or otherwise excluded microphones, sounds from the vehicle speakers/sound system, and the like, may be cancelled, either during the process of determining the location of the incoming STT data or after confirmation/estimation of such data.

Following assignment of a location to the STT data, such data, in some embodiments along with the location data itself, may be transmitted to system 110 for further analysis and/or execution of any commands that may be associated with the incoming STT data.

In another example of a method for use of system 100, STT data may be received from two or more occupants, such as occupants 1 and 2, or the incoming STT data may be inconclusive between such occupants. System 100 may, in some such embodiments and implementations, prioritize incoming STT data from one of the seat positions, such as driver/occupant 1, as a "tie-breaker." In other words, incoming STT data associated or at least estimated to have been generated from the driver may be processed and/or may result in action and/or response prior to incoming STT data from other occupants. In some embodiments, however, incoming STT data from all possible occupants may be stored and may be processed and/or result in action/response later in order of priority. In some embodiments, the priority may be pre-assigned by a user.

Figure 2:
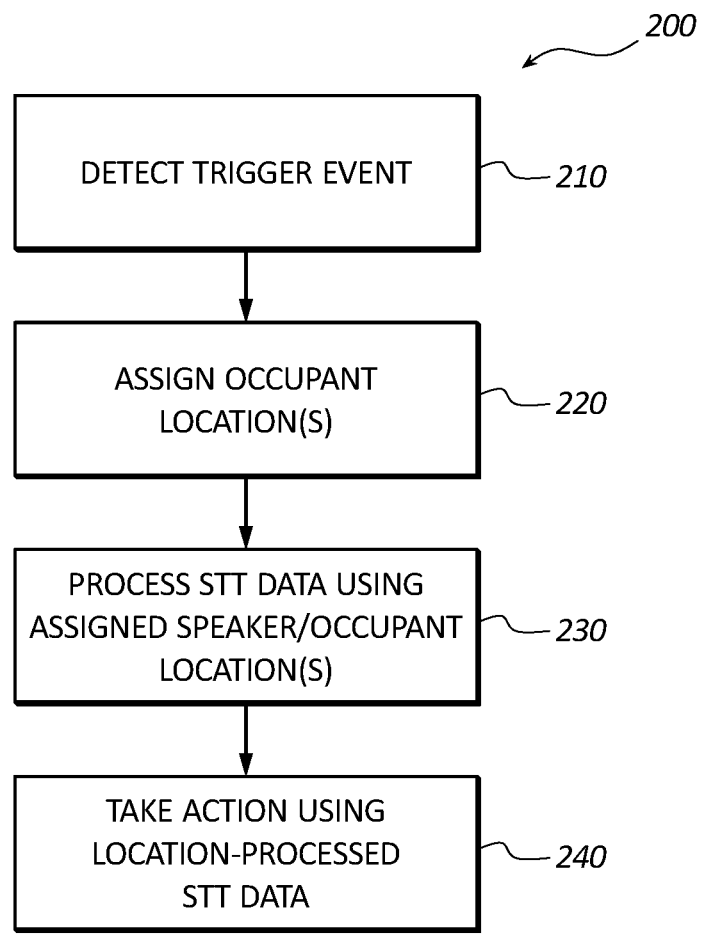
FIG. 2 is a flow chart illustrating an example of a method for improving vehicle speech recognition according to some implementations.

FIG. 2 is a flow chart illustrating an example of a method 200 for improving speech recognition within a vehicle according to some implementations. In this exemplary method, a trigger event may be detected at 210. For example, in some implementations, a pull sequence may be detected using, for example, a payout sensor or other sensor that may be located within a seatbelt retractor of a seatbelt assembly. In some embodiments, a vehicle/system may be configured with such sensors in every seatbelt retractor, or in another suitable location within each seatbelt assembly and/or seat in the vehicle. Examples of pull sequences that may be used as a trigger to identify speech recognition are mentioned above and include, for example, a series of quick pulls of the seatbelt, one or more pulls to a threshold length, which may utilize an existing payout sensor so as to not require additional hardware to implement, or one or more pulls in a particular direction, preferably one that would be unlikely to be unintentionally triggered.

As another example of a trigger event, in some implementations, step 210 may comprise detecting vehicle occupant speech associated with one or more seats in the vehicle. Thus, for example, some implementations may compare audio from a plurality of microphones, each of which may be linked with a particular seat in the vehicle (such as by incorporating a microphone into each seatbelt of the vehicle, for example). Thus, in some implementations, the trigger event may be detecting occupant speech from one or more microphones. Alternatively, the trigger event may be simply detecting audio satisfying one or more criteria. The audio may then be processed and/or compared to estimate or, in some cases determine conclusively, which vehicle occupant is speaking and/or which vehicle occupant speaker to prioritize for generating speech-to-text data.

Thus, one or more vehicle occupant locations may be assigned at step 220. For example, if audio from multiple different microphones each associated with a separate seat/occupant of the vehicle is compared, the volume or other characteristics of the audio from each microphone may be used to estimate the probability of occupant speech being generated from a particular seat/speaker/occupant. The audio from this seat location may then be assigned to that seat. This assignment may then be used in various further actions/responses to the STT data, as described throughout this disclosure, including, for example, directing TTS to the assigned seat/occupant, assessing TTS commands and adjusting responses according to the seat/occupant assignment (such as choosing whether to respond/comply with the command, the order in which the response/action will be taken, taking an action directed to the seat/occupant, etc.), and/or personalizing responses to the occupant in the assigned seat. In some embodiments and implementations, video or other image data may also, or alternatively, be used during the seat assignment step to improve the accuracy of the seat/speaker determination and/or assignment.

Alternatively, the determination of occupant location(s) in step 220 may be definitive rather than probabilistic. For example, occupant locations may be assigned at step 220 by detecting a seatbelt pull sequence, which may be used to trigger actuation of a microphone associated with the seatbelt associated with the pull sequence and/or adjust the system to anticipate incoming speech for speech-to-text processing, as previously mentioned.

Method 200 may then proceed to step 230, at which point speech-to-text data may be processed using the assigned occupant locations from step 220. For example, in some implementations, step 230 may comprise linking audio/speech data with a particular assigned seat/occupant location. In some implementations, multiple sets of incoming audio data sets may be linked separately with its respective seat/location and processed, either simultaneously or sequentially based upon, for example, the order of receipt of the audio and/or a prioritization scheme. In some embodiments and implementations, step 230 may further comprise use of image data, such as video data, from cameras in the vehicle, which may be used to confirm and/or improve the accuracy of the occupant assignment(s).

Step 240 may then comprise taking one or more actions using the location-processed speech-to-text data. For example, in some implementations, step 240 may comprise muting or at least decreasing the sensitivity of all microphones other than the one or more microphones linked to the incoming audio, the triggers of step 210, or otherwise assigned in step 220. Thus, for example, if the driver either actuated a pull sequence, was assigned as the speaker based upon an analysis of the audio, or otherwise was assigned as the speaker, each of the other microphones may be muted to allow the driver to command the vehicle system or otherwise use the speech-to-text module of the system.

As another example, in some embodiments, the action of step 240 may comprise comparing the location of the speaker or speakers with a prioritization scheme and adjusting the action(s) of the system accordingly. For example, if the audio request/command is detected as having been received by someone other than the driver, certain types of requests/commands may be ignored, others may be delayed and/or performed in a predetermined sequence (such as a sequence based upon the assigned seat/occupant locations), and still others may be performed immediately.

As still another example, in some embodiments and implementations, a response may be custom delivered using a text-to-speech module, for example, to the assigned occupant location(s). For example, if the passenger seat is identified as the speaker, a response to a request from the passenger may be delivered only to a speaker linked with the passenger seat and/or may be otherwise directed to the passenger by delivering a response including the name of the passenger from a common speaker in the vehicle.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. A method for improving speech recognition within a vehicle, the method comprising the steps of:
    receiving image data from one or more cameras located within the vehicle;
    determining a location of a vehicle occupant based on the image data;
    determining the vehicle occupant is speaking based on the image data;
    and
    adjusting an operational parameter of a system of the vehicle based upon the location of the vehicle occupant and the determination that the vehicle occupant is speaking.

2. The method of claim 1, wherein the step of adjusting the operational parameter of the system of the vehicle comprises processing, by a speech to text module, data from at least one microphone associated with the location of the vehicle occupant, wherein the at least one microphone is part of a set of a plurality of microphones disposed within the vehicle.

3. The method of claim 2, wherein the step of adjusting the operational parameter of the system of the vehicle comprises refraining from processing, by the speech to text module, data from at least a second microphone disposed within the vehicle.

4. The method of claim 3, wherein the step of adjusting the operational parameter comprising shutting off the second microphone.

5. The method of claim 1, wherein, the step of adjusting the operational parameter of the system of the vehicle comprises prioritizing one or more actions based upon the location of the vehicle occupant.

6. The method of claim 5, wherein the step of adjusting the operational parameter of the system of the vehicle is based on a prioritization scheme.

7. The method of claim 6, further comprising comparing the location of the vehicle occupant and a location of a second vehicle occupant.

8. The method of claim 6, further comprising determining the vehicle occupant is a driver based on the location of the vehicle occupant.

9. The method of claim 8, further comprising determining a priority for speech received from the vehicle occupant is higher than a priority for speech received from a second vehicle occupant.

10. The method of claim 9, further comprising adjusting the prioritization scheme, wherein an adjusted priority for speech received from the vehicle occupant is lower than an adjusted priority for speech received from the second vehicle occupant.

11. An apparatus comprising:
    a memory; and
    a processor coupled to the memory, the processor configured to:
        receive image data from one or more cameras located within a vehicle;
        determine a location of a vehicle occupant based on the image data;
        determine the vehicle occupant is speaking based on the image data; and
        adjust an operational parameter of a system of the vehicle based upon the location of the vehicle occupant and the determination that the vehicle occupant is speaking.

12. The apparatus of claim 11, wherein adjusting the operational parameter of the system comprises processing, by a speech to text module, data from at least one microphone associated with the location of the vehicle occupant, wherein the at least one microphone is part of a set of a plurality of microphones disposed within the vehicle.

13. The apparatus of claim 12, wherein each of the plurality of microphones is physically coupled to a respective seatbelt of the vehicle.

14. The apparatus of claim 12, wherein adjusting the operational parameter of the system comprises refraining from processing, by the speech to text module, data from at least a second microphone disposed within the vehicle.

15. The apparatus of claim 14, wherein adjusting the operational parameter of the system comprises shutting off the second microphone.

16. The apparatus of claim 11, wherein adjusting the operational parameter of the system comprises prioritizing one or more actions based upon the location of the vehicle occupant.

17. The apparatus of claim 16, wherein adjusting the operational parameter of the system is based on a prioritization scheme.

18. The apparatus of claim 17, wherein the processor is configured to compare the location of the vehicle occupant and a location of a second vehicle occupant.

19. The apparatus of claim 17, wherein the processor is configured to determine the vehicle occupant is a driver based, on the location of the vehicle occupant.

20. The apparatus of claim 19, wherein the processor is configured to determine a priority for speech received from the vehicle occupant is higher than a priority for speech received from a second vehicle occupant.

21. The apparatus of claim 20, wherein the processor is configured to adjust the prioritization scheme, wherein an adjusted priority for speech received from the vehicle occupant is lower than an adjusted priority for speech received from the second vehicle occupant.

22. The apparatus of claim 11, wherein the processor is configured to receive a signal from a sensor coupled with a seatbelt assembly located within the vehicle, wherein adjusting the operational parameter of the system of the vehicle is further based on the signal.

23. The apparatus of claim 22, wherein the processor is configured to receive data from at least one microphone coupled to the seatbelt assembly, wherein adjusting the operational parameter of the system of the vehicle is further based on data received from the at least one microphone.

24. The apparatus of claim 22, wherein the processor is configured to process the signal to detect a predetermined sequence associated with a manipulation of the seatbelt assembly, wherein adjusting the operational parameter of the system of the vehicle is further based on the detection of the predetermined sequence.

25. The apparatus of claim 24, wherein the sensor is positioned within a seatbelt retractor of the seatbelt assembly.

26. The apparatus of claim 25, wherein the sensor comprises a payout sensor.

27. The apparatus of claim 11, wherein the processor is configured to generate audio based, on the location of the vehicle occupant.

28. The apparatus of claim 27, wherein the audio comprises targeted audio.

29. The apparatus of claim 28, wherein the targeted audio comprises targeted speech.

* * * * *